US010589728B2

(12) United States Patent
Miller, Jr. et al.

(10) Patent No.: US 10,589,728 B2
(45) Date of Patent: Mar. 17, 2020

(54) SYSTEM AND METHOD FOR CONTROLLING WHEEL BRAKES ON A TRAILER IN A TRACTOR-TRAILER

(71) Applicant: Bendix Commercial Vehicle Systems LLC, Elyria, OH (US)

(72) Inventors: Thomas S. Miller, Jr., Lagrange, OH (US); Jeffrey M. Carbaugh, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 15/943,907

(22) Filed: Apr. 3, 2018

(65) Prior Publication Data

US 2019/0299946 A1  Oct. 3, 2019

(51) Int. Cl.
B60T 8/17 (2006.01)
B60T 7/20 (2006.01)
(Continued)

(52) U.S. Cl.
CPC .............. B60T 8/1708 (2013.01); B60T 7/20 (2013.01); B60T 8/17551 (2013.01);
(Continued)

(58) Field of Classification Search
CPC .... B60T 7/20; B60T 8/17551; B60T 8/17636; B60T 8/38; B60T 13/662; B60T 8/1708;
(Continued)

(56) References Cited

U.S. PATENT DOCUMENTS

| 3,804,999 A | 4/1974 | Hubbard |
| 5,022,714 A | 6/1991 | Breen |
| (Continued) | | |

FOREIGN PATENT DOCUMENTS

| DE | 102008029488 A1 | 12/2009 |
| EP | 1439103 B1 | 1/2006 |
| (Continued) | | |

OTHER PUBLICATIONS

International Search Report issued in corresponding International (PCT) Patent Application No. PCT/US2019/023962.
(Continued)

*Primary Examiner* — Vishal R Sahni
(74) *Attorney, Agent, or Firm* — Reising Ethington P.C.

(57) ABSTRACT

A system and method for controlling wheel brakes on a trailer in a tractor-trailer are provided. Upon receiving a command to apply a trailer wheel brake, the system determines a speed of the tractor-trailer responsive to a speed signal generated by a vehicle speed sensor. The system also estimates a threshold speed based on a level of friction between the tractor-trailer and a road surface on which the tractor-trailer is travelling. The system then generates a control signal to control delivery of fluid pressure to the trailer wheel brake. The control signal causes delivery of a first fluid pressure to the trailer wheel brake when the speed meets a predetermined condition relative to the threshold speed and a second fluid pressure, less than the first fluid pressure, when the speed does not meet the predetermined condition.

26 Claims, 4 Drawing Sheets

(51) Int. Cl.
*B60T 13/66* (2006.01)
*B60T 8/1755* (2006.01)
*B60T 8/38* (2006.01)
*B60T 8/1763* (2006.01)

(52) U.S. Cl.
CPC ............ *B60T 8/17636* (2013.01); *B60T 8/38* (2013.01); *B60T 13/662* (2013.01); *B60T 2210/12* (2013.01); *B60T 2230/06* (2013.01); *B60T 2250/03* (2013.01); *B60T 2250/04* (2013.01); *B60T 2270/10* (2013.01)

(58) Field of Classification Search
CPC ............ B60T 2250/03; B60T 2250/04; B60T 2210/12; B60T 2230/06; B60T 2270/10
See application file for complete search history.

(56) References Cited

U.S. PATENT DOCUMENTS

| | | |
|---|---|---|
| 5,295,736 A | 3/1994 | Brearley |
| 5,411,322 A * | 5/1995 | Breen .................. B60T 8/1708 303/150 |
| 5,421,644 A * | 6/1995 | Prescott ................ B60T 8/1764 188/181 C |
| 6,516,260 B2 | 2/2003 | Wetzel et al. |
| 6,843,351 B2 | 1/2005 | Stummer |
| 7,204,564 B2 | 4/2007 | Brown et al. |
| 7,216,026 B2 * | 5/2007 | Heuer .................. B60T 8/1708 180/282 |
| 8,010,253 B2 | 8/2011 | Lundquist |
| 8,165,768 B2 | 4/2012 | Leschuk et al. |
| 8,256,851 B2 | 9/2012 | Pelosse |
| 8,746,812 B2 | 6/2014 | Albright et al. |
| 8,757,735 B2 | 6/2014 | Marsden et al. |
| 8,789,896 B2 | 7/2014 | Albright et al. |
| 8,983,729 B2 | 3/2015 | Hahne |
| 9,475,470 B2 | 10/2016 | Maitlen |
| 2001/0032043 A1 * | 10/2001 | Wetzel .................. B60T 8/1708 701/50 |
| 2006/0229782 A1 | 10/2006 | Deng et al. |
| 2009/0082935 A1 | 3/2009 | Leschuk et al. |
| 2014/0025273 A1 | 1/2014 | Theel et al. |
| 2014/0046566 A1 * | 2/2014 | Maitlen .................. B60T 8/1701 701/70 |
| 2018/0354478 A1 * | 12/2018 | Eckert .................... B60T 8/172 |

FOREIGN PATENT DOCUMENTS

| | | |
|---|---|---|
| EP | 2338721 A2 | 6/2011 |
| EP | 2269880 B1 | 7/2015 |
| EP | 2512890 B1 | 1/2017 |

OTHER PUBLICATIONS

Written Opinion issued in corresponding International (PCT) Patent Application No. PCT/US2019/023962.

* cited by examiner

SYSTEM AND METHOD FOR CONTROLLING WHEEL BRAKES ON A TRAILER IN A TRACTOR-TRAILER

BACKGROUND OF THE INVENTION a. Field of the Invention

This invention relates to a system and method for controlling wheel brakes in a tractor-trailer. In particular, the invention relates to a system and method for controlling wheel brakes on a trailer in a tractor-trailer in a manner that increases the braking force applied by the trailer wheel brakes and reduces stopping distance when conditions indicate stability in the trailer.

b. Background Art

Vehicles, including tractor-trailers, increasingly employ advanced driver assistance systems (ADAS) that assume control, or supplement operator control, of various vehicle systems based on conditions associated with the vehicle, the road surface, and objects that surround the vehicle including pedestrians, other vehicles and road infrastructure. Exemplary systems include adaptive cruise control systems, anti-lock braking systems (ABS), and collision avoidance systems including, for example, blind spot monitoring, lane departure warning and lane change assist systems. Another conventional system is referred to as automated emergency braking (AEB) and may be implemented as a stand-alone system or as a function of one of the systems mentioned above. In AEB, emergency braking is implemented when certain conditions are detected in order to slow or stop movement of the vehicle. When conditions are detected that require braking, a controller generates one or more commands causing application of the vehicle wheel brakes. In tractor-trailers, it is important that the stability of each trailer is maintained during emergency braking. Anti-lock braking systems on a trailer can be used to help maintain the stability of the trailer. The AEB system controller, however, is typically located on the tractor and does not always know whether or not the trailers have fully operational ABS—particularly where the tractor is coupled to multiple trailers. As a result, the AEB system will frequently modulate (pulse) delivery of fluid pressure to the trailer wheel brakes in order to insure the stability of the trailer during braking. Modulating delivery of fluid pressure, however, reduces the braking force and increases the stopping distance for the tractor-trailer.

The inventors herein have recognized a need for a system and method for controlling wheel brakes on a trailer in a tractor-trailer that will minimize and/or eliminate one or more of the above-identified deficiencies.

BRIEF SUMMARY OF THE INVENTION

This invention relates to a system and method for controlling wheel brakes in a tractor-trailer. In particular, the invention relates to a system and method for controlling wheel brakes on a trailer in a tractor-trailer in a manner that increases the braking force applied by the trailer wheel brakes and reduces stopping distance when conditions indicate stability in the trailer.

A system for controlling wheel brakes on a trailer in a tractor-trailer in accordance with one embodiment includes a vehicle speed sensor configured to generate a speed signal indicative of a speed of the tractor-trailer. The system further includes a controller configured to receive a command to apply a trailer wheel brake of a trailer of the tractor-trailer and to determine, in response to the command, the speed of the tractor-trailer responsive to the speed signal. The controller is further configured to establish a threshold speed responsive to a level of friction between the tractor-trailer and a road surface on which the tractor-trailer is travelling and to generate a control signal to control delivery of fluid pressure to the trailer wheel brake. The control signal is configured to cause delivery of a first fluid pressure to the trailer wheel brake when the speed meets a first predetermined condition relative to the threshold speed and a second fluid pressure, less than the first fluid pressure, when the speed does not meet the first predetermined condition relative to the threshold speed.

A system for controlling wheel brakes on a trailer in a tractor-trailer in accordance with another embodiment includes a vehicle speed sensor configured to generate a speed signal indicative of a speed of the tractor-trailer. The system further includes a controller configured to receive a command to apply a trailer wheel brake of a trailer of the tractor-trailer, to determine, in response to the command, the speed of the tractor-trailer responsive to the speed signal and to determine, in response to the command, a value for an operating parameter of the tractor-trailer indicative of a level of friction between the tractor-trailer and a road surface on which the tractor-trailer is travelling. The controller is further configured to generate a control signal to control delivery of fluid pressure to the trailer wheel brake. The control signal is configured to cause delivery of a first fluid pressure to the trailer wheel brake when the speed meets a first predetermined condition relative to a threshold speed and the value of the operating parameter meets a second predetermined condition and a second fluid pressure, less than the first fluid pressure, when the speed does not meet the first predetermined condition relative to the threshold speed or the value of the operating parameter does not meet the second predetermined condition.

An article of manufacture in accordance with one embodiment includes a non-transitory computer storage medium having a computer program encoded thereon that when executed by a controller controls a trailer wheel brake on a trailer in a tractor-trailer. The computer program includes code for determining, in response to a command to apply a trailer wheel brake of a trailer of the tractor-trailer, a speed of the tractor-trailer responsive to a speed signal generated by a vehicle speed sensor and indicative of the speed of the tractor-trailer. The computer program further includes code for establishing a threshold speed responsive to a level of friction between the tractor-trailer and a road surface on which the tractor-trailer is travelling and generating a control signal to control delivery of fluid pressure to the trailer wheel brake. The control signal is configured to cause delivery of a first fluid pressure to the trailer wheel brake when the speed meets a first predetermined condition relative to the threshold speed and a second fluid pressure, less than the first fluid pressure, when the speed does not meet the first predetermined condition relative to the threshold speed.

A method of controlling wheel brakes on a trailer in a tractor-trailer in accordance with one embodiment includes the steps of receiving a command to apply a trailer wheel brake of a trailer of the tractor-trailer and determining, in response to the command, a speed of the tractor-trailer responsive to a speed signal generated by a vehicle speed sensor and indicative of the speed of the tractor-trailer. The method further includes the steps of establishing a threshold speed responsive to a level of friction between the tractor-trailer and a road surface on which the tractor-trailer is travelling and generating a control signal to control delivery of fluid pressure to the trailer wheel brake. The control signal is configured to cause delivery of a first fluid pressure to the trailer wheel brake when the speed meets a first predetermined condition relative to the threshold speed and a second fluid pressure, less than the first fluid pressure, when the speed does not meet the first predetermined condition relative to the threshold speed.

A system and method for controlling wheel brakes on a trailer in a tractor-trailer in accordance the present teachings represent an improvement as compared to conventional systems and methods. In particular, the system and method disclosed herein identify certain conditions that are indicative of trailer stability. During such conditions, increased braking forces can be applied to the trailer wheel brakes when needed for emergency braking even when the AEB system on the tractor lacks knowledge regarding whether one or more trailers has an anti-lock braking system or other automated system that would help maintain the stability of the trailer. In this manner, the stopping distance of the tractor-trailer can be reduced during emergency braking events.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
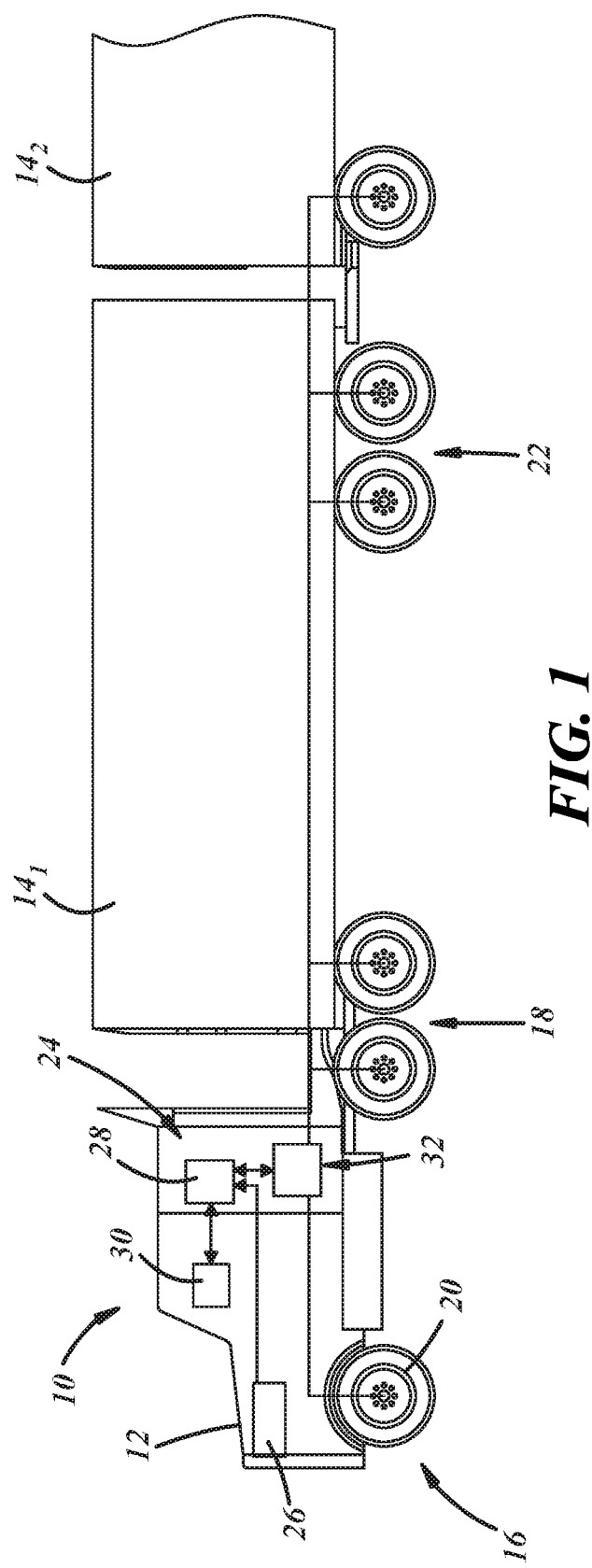
FIG. 1 is a diagrammatic view of a tractor-trailer incorporating a system for controlling wheel brakes on the trailer in accordance with one embodiment of the present teachings.

Referring now to the drawings wherein like reference numerals are used to identify identical components in the various views, FIG. 1 illustrates a tractor-trailer 10. Tractor-trailer 10 (also referred to as a semi) contains a truck or tractor 12 and one or more trailers $14_1 \ldots 14_N$. Tractor 12 contains a power unit, such as an internal combustion engine, and steering and drive axles 16, 18 each of which support one or more wheels 20 at either end. Trailers $14_1 \ldots 14_N$ are provided to store freight and are detachably coupled to tractor 12. Each trailer 14 is supported on one or more trailer axles 22, each of which may support one or more wheels 20 at either end. Although a pair of trailers 14 are shown in the illustrated embodiment, it should be understood that the number of trailers 14 attached to tractor 12 may vary. In accordance with the present teachings, tractor-trailer 10 may further include one or more advanced driver assistance systems 24 configured to implement automated emergency braking (AEB) of wheels 20 under certain conditions. System 24 may comprise, for example, a collision avoidance system and may include one or more sensors 26, a controller 28 and an operator interface 30 that communicate with one another over a conventional vehicle communication bus such as a controller area network (CAN).

Sensors 26 are provided to identify objects within a define field of view. Sensors 26 may comprise radar (radio detection and ranging) sensors, but may also comprise lidar (light detection and ranging) sensors, cameras or other sensors. In the illustrated embodiment, sensors 26 are located at the front of tractor 12 and identify objects in front of tractor-trailer 10. It should be understood, however, that sensors 26 could be located at various locations on tractor-trailer 10 including on the sides of the vehicle (e.g., for blind spot monitoring, lane departure warning and lane change assist systems) or rear of the vehicle (e.g., for parking assistance systems). Each sensor 26 generates a digital signal indicative of an object within the field of view of the sensor 26 and transmits the signal to controller 28.

Controller 28 determines whether objects detected by sensors 26 justify a warning to the vehicle operator or some other action including autonomous control of tractor-trailer 10 such as automated emergency braking. Controller 28 may comprise a programmable microprocessor or microcontroller or may comprise an application specific integrated circuit (ASIC). Controller 28 may include a central processing unit (CPU). Controller 28 may also include an input/output (I/O) interface through which controller 28 may receive a plurality of input signals and transmit a plurality of output signals. The input signals may include signals from sensors 26 indicative of the presence of objects within the field of view of sensors 26. The output signals may include signals used to control operator interface 30 or other vehicle systems as described below.

Operator interface 30 provides a means for indicating the location of an object to the vehicle operator (e.g., by providing a warning when an object is too close to tractor-trailer 10). Interface 30 may include light emitters, such as light emitting diodes, or sound emitters, such as a speaker, to convey visual and/or audio warnings. In the case of visual warnings, information about the location of the object (e.g., left or right side of the vehicle and fore-aft location of the object relative to the vehicle) or other characteristics of the object (e.g., speed) can be conveyed through differences in color, differences in intensity, differences in the number of lights, and differences in the pattern of activation of the lights. In the case of audio warnings, similar information can be conveyed through differences in the type of sound generated, differences in volume and differences in the pattern of sounds.

Figure 2:
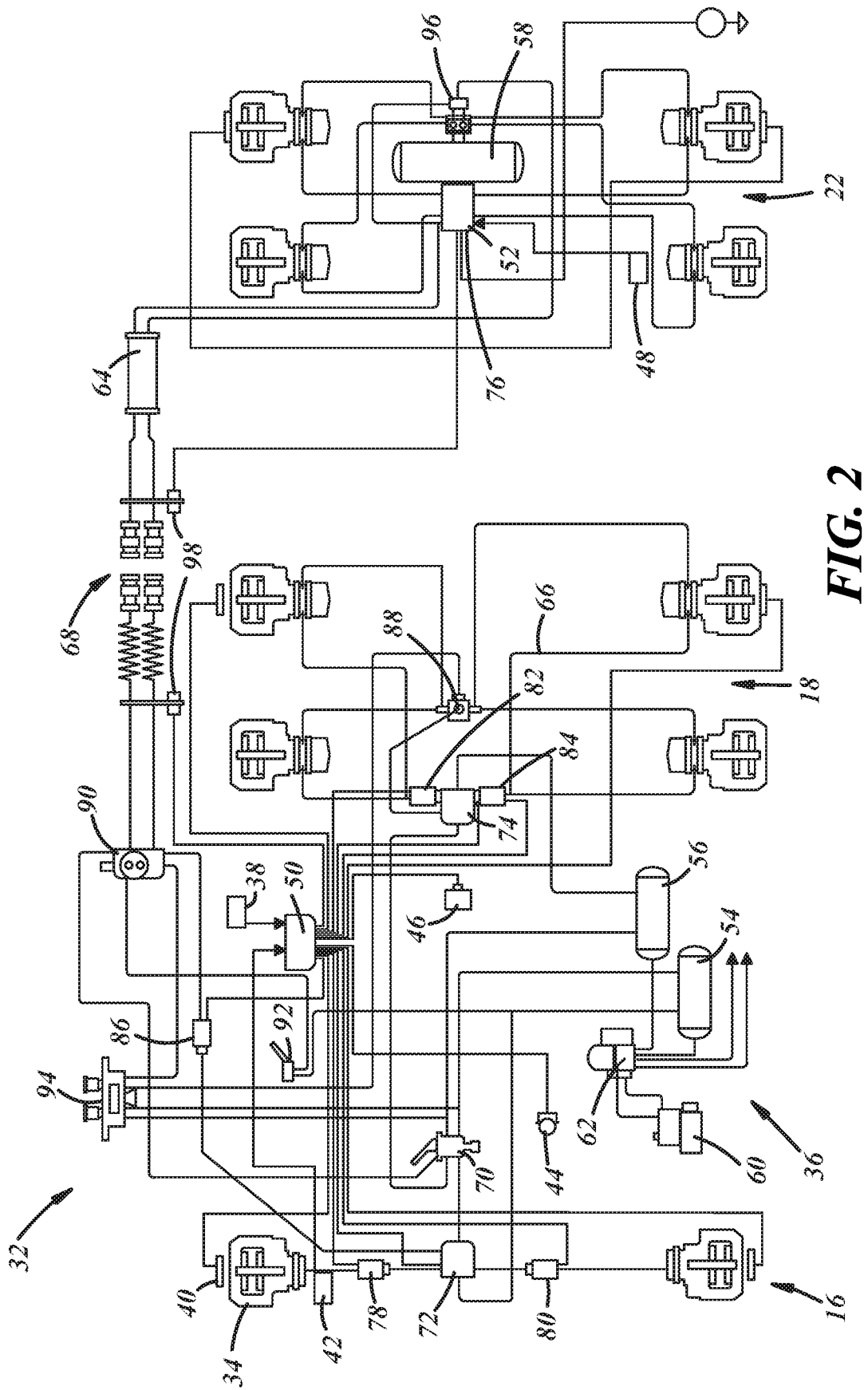
FIG. 2 is a diagrammatic and schematic view of a portion of the tractor-trailer in FIG. 1.

Tractor-trailer 10 further includes a braking system 32 configured to brakes wheels 20 on tractor 12 and trailers 14 in order to slow or stop movement of tractor-trailer 10. As discussed in greater detail below, system 32 may include components on both tractor 12 and trailer 14 that may be in fluid and/or electrical communication using conventional connectors between tractor 12 and trailer 14. In accordance with the present teachings, system 32 may communicate with system 24 over the CAN on tractor-trailer 10 (or another communications medium such as power line communication (PLC)). In particular, system 32 may be configured to brake wheels 20 in response to a braking command generated by controller 28 of system 24 whenever controller 28 determines that automated emergency braking is required based on signals generated by sensors 26 in system 24. Referring now to FIG. 2, braking system 32 may include wheel brakes 34, a fluid circuit 36 that supplies fluid pressure to wheel brakes 34, various sensors including vehicle speed sensors such as an engine or transmission speed sensor 38 and wheel speed sensors 40, pressure sensors 42, a steer angle sensor 44, a yaw rate sensor 46, and load sensors 48, and one or more controllers 50, 52.

Wheel brakes 34 are configured to apply a braking force to wheels 20. In the illustrated embodiment, brakes 34 comprise disc brakes in which a carrier supports brake pads on opposite sides of a rotor rotating with the wheel 20 and an actuator causes, responsive to fluid pressure delivered by fluid circuit 36, movement of a caliper relative to the carrier to move the brake pads into and out of engagement with the rotor. It should be understood, however, that one ore more of wheel brakes 34 may alternatively comprise drum brakes in which an actuator such as a cam or piston causes, responsive to fluid pressure delivered by fluid circuit 36, movement of one or more brake shoes into engagement with a braking surface in a brake drum rotating with wheel 20.

Fluid circuit 36 generates fluid pressure within system 30 and controls the delivery of fluid pressure to the actuator of each wheel brake 34. Circuit 36 may include components for generating and storing pressurized fluid including fluid reservoirs 54, 56, 58, a compressor 60, and air dryers 62, 64 and components for routing and delivering fluid pressure to wheel brakes 34 including fluid conduits 66, glad-hand connectors 68 between tractor 12 and trailer 14, and various valves including food pedal valve 70, relay valves 72, 74, 76, modulator valves 78, 80, 82, 84, 86, quick release valve 88, tractor protection valve 90, trailer control valve 92, dash control valve 94 and trailer parking control valve 96.

Fluid reservoirs 54, 56, 58 store compressed fluid for use in applying wheel brakes 34. Reservoir 54 supplies pressurized fluid to the wheel brakes for steer axle 16 and has a fluid port coupled to air dryer 62 and fluid ports coupled to relay valve 72. Reservoir 56 supplies pressurized fluid to the wheel brakes for drive axles 18 and has a fluid port coupled to air dryer 62 and fluid ports coupled to relay valve 74. Reservoir 58 supplies pressurized fluid to the wheel brakes for trailer axle 22 has a fluid port coupled to trailer parking control valve 96.

Compressor 60 draws in air and compresses the air for delivery to reservoirs 54, 56 through air dryer 62. Compressor 60 has one or more fluid ports coupled to air dryer 62.

Air dryers 62, 64 are provided to collect and remove solid, liquid and vapor contaminants from pressurized fluid. Air dryer 62 is disposed between compressor 60 and reservoirs 54, 56 and has fluid ports coupled to compressor 60 and each reservoir 54, 56. Air dryer 64 is supported on trailer 14 between glad-hand connectors 68 and relay valve 76 and has fluid ports coupled to glad-hand connectors 68 and relay valve 76. Air dryer 64 assists in removing contaminants from the fluid in situations where tractor 12 lacks an air dryer and/or when trailer 14 becomes disconnected from tractor 12.

Fluid conduits 66 are used to transport fluid between reservoirs 54, 56, 58, compressor 60, air dryers 62, 64, glad-hand connectors 68, valves 70, 72, 74, 76, 78, 80, 82, 84, 86, 88, 90, 92, 94, 96 and wheel brakes 34. Conduits 66 may be made from conventional metals and/or plastics and have connectors at either end configured to join the conduits 66 to corresponding components of circuit 36.

Glad-hand connectors 68 are used to transmit pressurized fluid from tractor 12 to trailer 14. One of connectors 68 is used to transmit fluid used during emergency braking while the other connector 68 is used to transmit fluid used during service braking.

Foot pedal valve 70 is provided to allow controlled application of the brakes 34 by the vehicle operator by selectively releasing fluid pressure from fluid reservoirs 54, 56. Valve 70 is supported within the cabin of tractor 12. Actuation of valve 70 by the vehicle operator allows fluid pressure to flow from reservoirs 54, 56 to relay valves 72, 74 and/or tractor protection valve 90 and valve 70 therefore has fluid ports in communication with reservoirs 54, 56 and valves 72, 74, 90.

Relay valves 72, 74, 76 increase the volume of fluid, and therefore the speed, at which fluid is delivered to, and exhausted from, wheel brakes 34 in order to eliminate lag times between the commanded and actual application and release of brakes 34. Relay valve 72 has fluid ports in communication with food pedal valve 70, reservoir 54 and modulator valves 78, 80, 86. Relay valve 74 has fluid ports in communication with food pedal valve 70, reservoir 56, modulator valves 82, 84 and quick release valve 88. Relay valve 76 has fluid ports in communication with air dryer 64, trailer parking control valve 96 and each wheel brake 34. Relay valve 76 may be integrated with a modulator valve and controller 52 in some embodiments. Relay valves 72, 74 and 76 may operate under the control of controllers 52, 54 to implement anti-lock braking/traction control when required.

Modulator valves 78, 80, 82, 84, 86 are provided to implement an anti-lock braking function. During normal braking, valves 78, 80, 82, 84, 86 allow fluid pressure to pass from relay valves 72, 74 to wheel brakes 34 without interference. During a loss of traction, however, signals from controller 52 causes valves 78, 80, 82, 84, 86 to modulate the fluid pressure to prevent lockup of the wheels 20. Modulator valves 78, 80 have fluid ports coupled to relay valve 72 and to wheel brakes 34 on steer axle 16. Modulator valves 82, 84 have fluid ports coupled to relay valve 74 and to wheel brakes 34 on drive axle 18. Finally, modulator valve 86 has fluid ports in communication with relay valve 72 and tractor protection valve 90.

Quick release valve 88 increases the speed at which fluid pressure is exhausted from wheel brakes 34 on drive axle 18 when brakes 34 are released. Valve 88 has fluid ports in communication with wheel brakes 34 on drive axle 18 and dash control valve 94.

Tractor protection valve 90 transmits pneumatic signals relating to operation of the trailer wheel brakes 34 from the tractor 12 to the trailer 14. Valve 98 also protects the fluid supply for tractor 12 in the event of a brake in the fluid connection between tractor 12 and trailer 14. Valve 98 has fluid ports in communication with foot pedal valve 70, modulator valve 86, trailer control valve 92, dash control valve 94, and glad-hand connectors 68.

Trailer control valve 92 allows the vehicle operator to control wheel brakes 34 on trailer 14 independent of the wheel brakes 34 on tractor 12. Valve 92 may be mounted within the cab of tractor 12 and permits delivery of fluid directly from reservoir 54 to tractor protection valve 90 for delivery to wheel brakes 34 in trailer 14. Valve 92 has fluid ports in communication with reservoir 54 and tractor protection valve 90.

Dash control valve 94 allows the vehicle operator to implement several functions including releasing parking brakes on tractor 12 or trailer 14 by supplying fluid pressure to oppose spring forces in the actuators for wheel brakes 34. Valve 94 has fluid ports in communication with reservoirs 54, 56, quick release valve 88 and tractor protection valve 90.

Trailer parking control valve 96 is provided to control the parking or emergency braking function of the actuators for the wheel brakes 34 on trailer 14. Valve 96 is mounted directly to reservoir 58. Valve 96 has fluid ports in communication with the reservoir 58, air dryer 64 and wheel brakes 34 on trailer 14.

Engine or transmission speed sensor 38 generates a signal indicative of the speed of tractor-trailer 10. Sensor 38 may comprise one or more magnets configured to track the rotation of a driveshaft or similar component in the drivetrain for tractor 12 and generate signals indicative of the speed of rotation. A controller, such as controller 52 can then determine the speed of tractor-trailer 10 responsive to the signal.

Wheel speed sensors 40 generate signals indicative of the rotational speed of a corresponding wheel 20. Each sensor 40 may include a magnet surrounded by a coil disposed proximate to a toothed ring on a wheel 20. Rotation of the toothed ring causes changes in the direction and intensity of the magnetic fields and is indicative of rotation of the wheel 20. Controllers 50, 52 can determine the rotational speed of each wheel 20 responsive to signals generated by sensors 40. Based on the rotational speed of wheels 20, controllers 50, 52 can determine whether certain wheels 20 are slipping and implement anti-lock braking through control of relay valves 72, 74, 76 and modulator valves 78, 80 82, 84, 86. Controllers 50, 52 can also determine the speed of tractor-trailer 10 responsive to the determined speed of wheels 20.

Pressure sensors 42 generate signals indicative of the fluid pressure at various locations within fluid circuit 36. Although only one pressure sensor 42 is illustrated in FIG. 2, it should be understood that pressure sensors 42 may be located through fluid circuit 36. In accordance with the present teachings, pressure sensors 42 may be used to determine the pressure applied at the wheel brakes 34 for one or more wheels on steer axle 16 or drive axle 18 on tractor 12 for a purpose described below.

Steer angle sensor 44 outputs a signal indicative of a steering angle imparted by a vehicle operator to a steering wheel in tractor 12. Sensor 44 may be mounted on a steering column within tractor 12.

Yaw rate sensor 46 generates a signal indicative of the angular velocity of tractor 12 about its vertical (yaw) axis. An electronic stability control system may compare the output of sensors 44, 46 to determine whether the intended direction of travel for tractor-trailer 10 (as indicated by sensor 44) matches the actual direction of travel (as indicated by sensor 46) and thereby determine whether there has been a loss of traction between the wheels 20 and the road. When the intended and actual directions of tractor-trailer 10 diverge, the system generates control signals for one or both of the vehicle engine and the wheel brakes 34 in order to control the torque at one or more of the wheels 20 so that the actual direction of tractor-trailer 10 will match the intended direction.

Load sensor 48 generates a signal indicative of the forces at a given location. In accordance with one aspect of the present teachings, a load sensor 48 may be used to determine the load on one or more of trailer axles 22 in order to assist in determining the stability of trailer 22 as discussed below. Load sensor 48 may comprise a strain gauge, piezoelectric sensor or a fluid (hydraulic or pneumatic) sensor.

Controllers 50, 52 control the operation of relay valves 72, 74, 76 and modulator valves 78, 80, 82, 84, 86 in order to control the fluid pressure delivered to wheel brakes 34 and, therefore, the braking force applied to wheels 20. Controllers 50, 52 may comprise programmable microprocessors or microcontrollers or may comprise application specific integrated circuits (ASICs). Each controller 50, 52 may include a memory and a central processing unit (CPU). Each controller 50, 52 may also include an input/output (I/O) interface including a plurality of input/output pins or terminals through which the controller 50, 52 may receive a plurality of input signals and transmit a plurality of output signals. The input signals may include signals received from controller 28 in system 24 and from sensors 40, 42, 44, 46, 48. The output signals may include signals used to control relay valves 72, 74, 76, and modulator valves 78, 80, 82, 84, 86. In the illustrated embodiment, tractor 12 and trailer 14 include separate controllers 50, 52 that may communicate with one another across an electrical connector 98 between tractor 12 and trailer 14. It should be understood, however, that the functionality of controllers 50, 52 could be combined into a single controller or further sub-divided among multiple sub-controllers. In accordance with the present teachings, one or both of controllers 50, 52 may be configured with appropriate programming instructions (i.e., software or a computer program) to implement several steps in a method for controlling the wheel brakes 34 on trailer 14 as described below.

Figure 3:
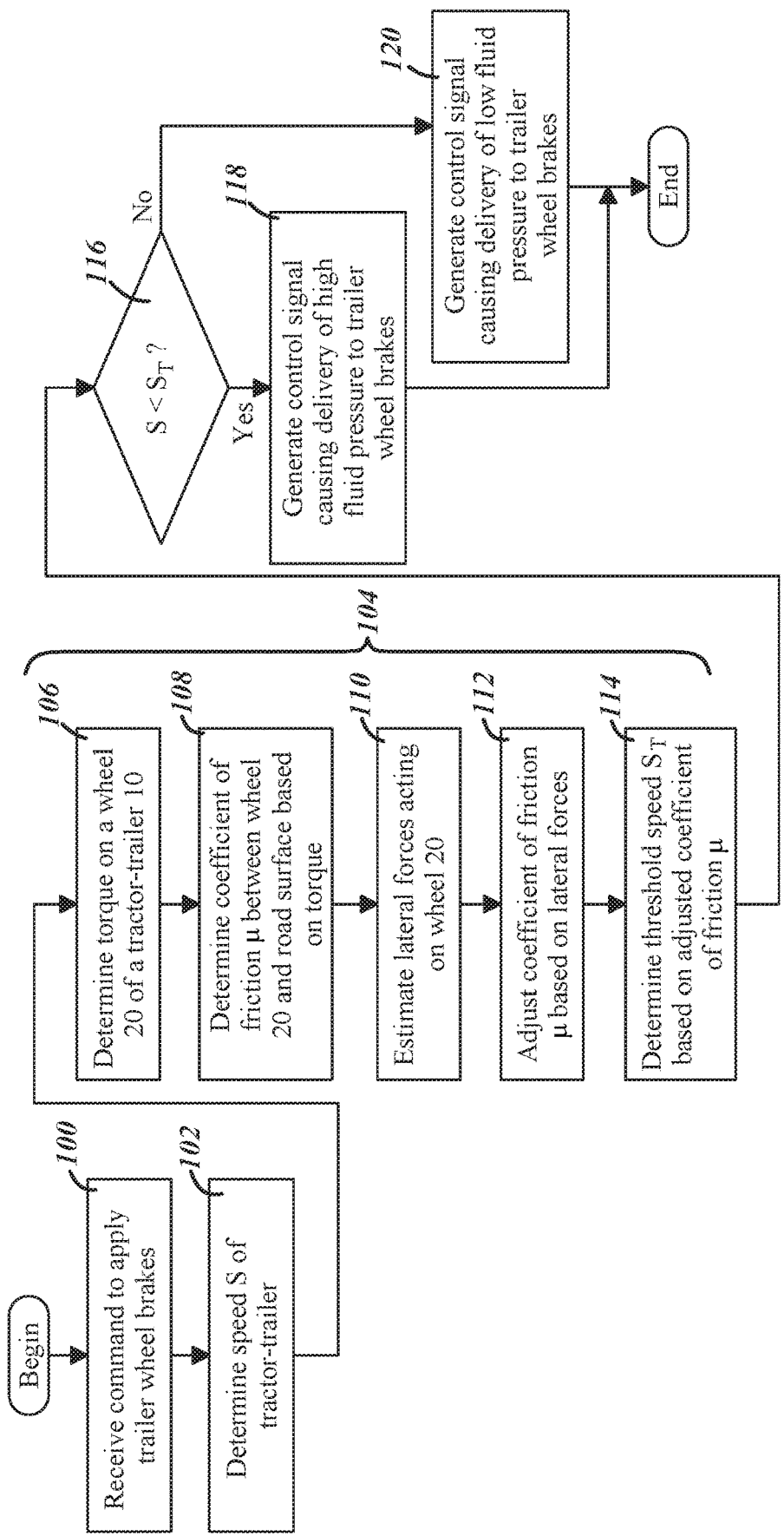
FIG. 3 is flow chart diagram illustrating several steps in a method for controlling wheel brakes on the trailer of a tractor-trailer in accordance with one embodiment of the present teachings.

Referring now to FIG. 3, one embodiment of a method for controlling the wheel brakes 34 on trailer 14 may begin with the step 100 of receiving a command to apply a wheel brake 34 for one of the wheels 20 on trailer 14. This command may be generated by system 22 or another system configured to initiate automated emergency braking of tractor-trailer 10. Controllers 50, 52 may receive the command and may be configured to generate control signals to relay valves 72, 74, 76 and/or modulator valves 78, 80, 82, 84, 86 in response in order to actuate wheel brakes 34 for wheels 20 on tractor 12 and trailer 14. Because it is not always known whether trailer 14 includes an anti-lock braking system to insure stability of trailer 14 during braking, conventional systems typically implement automated emergency braking of the brakes 34 on trailer 14 by modulating (pulsing) delivery of pressurized fluid to the brakes 34 on trailer 14. Modulated delivery of fluid to the brakes 34 reduces the likelihood that a wheel 20 will lock and increases the stability of trailer 14, but it also results in a longer stopping distance for tractor-trailer 10. In accordance with the present teachings, controllers 50, 52 are configured to perform several steps to assess the stability of trailer 14 and to control the delivery of fluid pressure to the wheel brakes 34 on trailer 14 in response, such that, when conditions indicate a relatively high degree of stability for trailer 14, increased fluid pressure can be delivered to the wheel brakes 34 on trailer 14.

Once a command to apply the wheel brakes 34 is received, controllers 50, 52 determine, in step 102, the speed of tractor-trailer 10. Controllers 50, 52 determine the speed of tractor-trailer 10 in response to a speed signal generated by a vehicle speed sensor on tractor-trailer 10. As the speed of a vehicle increases, the stability of the vehicle decreases (assuming other variables such as the road surface remain constant). Therefore, vehicle speed is an indicator of the stability of trailer 14. As discussed hereinabove, tractor-trailer 10 may include several sensors that may be used as vehicle speed sensors including engine or transmission speed sensor 38 and wheel speed sensors 40. Controllers 50, 52 may determine the speed of tractor-trailer 10 in response to signals generated by one or more of sensors 38, 40.

After determining the speed of tractor-trailer 10, controllers 50, 52 are configured to compare the determined speed to a threshold speed indicative of the stability of tractor-trailer 10 to see whether the determined speed meets a predetermined condition and then generate a control signal to control delivery of fluid pressure to the wheel brakes 34 on trailer 14 in response. In general, where the determined speed indicates a relatively high degree of stability for trailer 14, controllers 50, 52 will generate control signals that cause delivery of a relatively high fluid pressure to the wheels brakes 34 on trailer 14 to reduce the stopping distance of tractor-trailer 10 as discussed below. Where the determined speed indicates a relatively low degree of stability for trailer 14, controllers 50, 52 will generate control signals that cause delivery of a relatively low fluid pressure to the wheel brakes 34 on trailer 14 as also discussed below.

In certain embodiments of the invention, controllers 50, 52 are further configured, in step 104, to establish the threshold speed against which the determined speed of tractor-trailer 10 is compared based on one more indicators of the level of friction between the wheels 20 of tractor-trailer 10 and the road surface and, therefore, the stability of tractor-trailer 10. In particular, controllers 50, 52 may increase the threshold speed when those indicators indicate a relatively high level of friction (thereby allowing application of relatively high fluid pressure to the wheel brakes 34 of trailer 14 even at relatively high speeds as discussed below). Conversely, controllers 50, 52 may decrease the threshold speed when the indicators indicate a relatively low level of friction (thereby preventing application of relatively high fluid pressure to the wheel brakes 34 of trailer 14 unless the speed of tractor-trailer 10 is relatively low as discussed below). In one embodiment, controllers 50, 52 are configured to establish the predetermined speed responsive to one or more factors indicative of the direction of travel of the tractor-trailer 10 or the road surface on which tractor-trailer 10 is travelling. When tractor-trailer 10 turns, the wheels 20 are subjected to lateral forces that decrease the level of friction between the wheels 20 and the road surface. Thus, when tractor-trailer 10 is travelling in a straight line, controllers 50, 52 may be configured to set the threshold speed at a relatively high speed and when tractor-trailer 10 is turning, controllers 50, 52 may be configured to set the threshold speed at a relatively low speed. Controllers 50, 52 may determine the direction of travel of tractor-trailer 10 responsive to a steering signal generated by steer angle sensor 46 and indicative of an angle of rotation of a steering wheel of the tractor-trailer 10 or a yaw rate signal generated by yaw rate sensor 48. In another embodiment, controllers 50, 52 are configured to establish the threshold speed responsive to the brake pressure applied to one or more of the wheel brakes 34 on tractor 12. Brake pressure in the wheel brakes 34 on tractor 12 is indicative of road surface conditions. In particular, a relatively high fluid pressure applied to wheel brakes 34 on tractor 12 is indicative of the ability to rapidly decelerate and a high level of friction between the wheels 20 and the road surface. A relatively low fluid pressure applied to wheel brakes 34 on tractor 12 is indicative of a low level of friction between the wheels 20 and road surface. Controllers 50, 52 may determine the pressure at one or more of the wheel brakes 34 on tractor 12 responsive to signals generated by pressure sensors 38. In another embodiment, controllers 50, 52 are configured to establish the threshold speed responsive to whether anti-clock braking and/or automatic traction control have been activated for a wheel brake 34 on tractor 12. The activation of anti-lock braking and/or automatic traction control is indicative of wheel slip and, therefore, a relatively low level of friction between the wheels 20 on tractor 12 and the road surface. Because tractor 12 is generally forward of trailer 14 in the direction of travel of tractor-trailer 10, it can be assumed that the wheels 20 of trailer 14 will pass over the same road surface as the wheels 20 of tractor 12. Therefore, the activation of anti-lock braking or automatic traction control in tractor 12 will also indicate a decrease in stability of trailer 14. Because controller 50 implements anti-lock braking and/or automatic traction control when required through control signals issued to relay valves 72, 74 and modular valves 78, 80, 82, 84, 86, controller 50 can readily determine whether anti-lock braking or automatic traction control has been activated in one of the brakes 34 on tractor 12. This information can be passed to controller 52 over connector 98. In yet another embodiment, controllers 50, 52 are configured to establish the threshold speed responsive to a load applied to a trailer axle 22 of trailer 14. Greater loads will increase the level of friction between the wheels 20 on trailer 14 and the road surface and therefore increase the stability of trailer 14. Controller 52 may determine the load on one or more trailer axles 22 responsive to signals generated by a load sensor 48 and this information may be provided to controller 50 over connector 98.

Referring again to FIG. 3, in one embodiment, controllers 50, 52 are configured to establish the threshold speed using a plurality of the above-identified indicators of the level of friction between the wheels 20 of tractor-trailer 10 and the road surface (and, therefore, the stability of tractor-trailer 10). Referring to FIG. 3, step 104 may include several substeps to establish the threshold speed in this embodiment. In substep 106, controllers 50, 52 are configured to determine a torque on a wheel 20 of tractor-trailer 10. The torque generated on wheel 20 is indicative of the friction on between wheel 20 and the road surface. Controllers 50, 52 may determine the torque on wheel 20 based on the brake pressure in the wheel brake 34 associated with wheel 20 as measured by a pressure sensor 38 and known values for the size of a tire on wheel 20 and the gain of wheel brake 34. In substep 108, controllers 50, 52 determine a coefficient of friction between wheel 20 and the road surface. Controllers 50, 52 may determine the coefficient of friction in response to the torque determined in substep 106 and a load on the axle as measured by a load sensor 48. In particular, the coefficient of friction may be determined by dividing the wheel torque by the axle load. In substep 110, controllers 50, 52 may generate an estimate of lateral forces acting on the wheel 20. As discussed above, controllers 50, 52 may generate this estimate responsive to a steering signal generated by steer angle sensor 46 and indicative of an angle of rotation of a steering wheel of the tractor-trailer 10 or a yaw rate signal generated by yaw rate sensor 48. In substep 112, controllers 50, 52 may adjust the coefficient of friction obtained in substep 108 responsive to the lateral forces identified in substep 110 to obtain an adjusted coefficient of friction between the wheel 20 and the road surface. In addition to adjusting the coefficient based on lateral forces on tractor-trailer 10, controllers 50, 52 may be configured to adjust the coefficient based on other factors. In one embodiment, controllers 50, 52 may be configured to adjust the coefficient based on an ABS flag in a memory indicating whether an anti-locking braking system of the tractor-trailer 10 has been activated and an ATC flag in a memory indicative of whether an automatic traction control system of the tractor-trailer 10 has been activated. The degree of adjustment provided to the coefficient may be a predetermined increase or decrease responsive to one or more factors or be based on a formula taking into account one or more factors (e.g., with weighted values applied to each factor). In substep 114, controllers 50, 52 determine the threshold speed responsive to the adjusted coefficient of friction. In one embodiment, values for the adjusted coefficient of friction may be correlated with speed values in a look up table or other data structure stored in a memory within, or accessible by, controllers 50, 52.

After determining the speed of tractor-trailer 10 and establishing the threshold speed, controllers 50, 52 may compare the determined speed to the threshold speed to see whether the determined speed meets a predetermined condition and then generate a control signal to control delivery of fluid pressure to the wheel brakes 34 on trailer 14 in response. In general, where the determined speed indicates a relatively high degree of stability for trailer 14, controllers 50, 52 will generate control signals that cause delivery of a relatively high fluid pressure to the wheels brakes 34 on trailer 14 to reduce the stopping distance of tractor-trailer 10 as discussed below. Where the determined speed indicates a relatively low degree of stability for trailer 14, controllers 50, 52 will generate control signals that cause delivery of a relatively low fluid pressure to the wheel brakes 34 on trailer 14 as also discussed below.

In step 116, controllers 50, 52 compare the speed of tractor-trailer 10 determined in step 102 to the threshold speed established in step 104. Depending on the determinations made in step 116, the method continues with one of steps 118, 120. In steps 118, 120, controllers 50, 52 generate one or more control signals configured to control delivery of fluid pressure to the wheel brakes 34 on trailer 14. The signals may be directed to relay valve 76. If the speed determined in step 102 meets the predetermined condition relative to the threshold speed established in step 104, the method proceeds with step 118. In step 118, the control signals generated by controllers 50, 52 are configured to cause delivery of a relatively high fluid pressure to the wheel brakes 34 on trailer 14 because the conditions are indicative of a relatively high degree of stability for trailer 14. If the speed determined in step 104 does not meet the predetermined condition relative to the threshold speed established in step 104, the method proceeds with step 120. In step 120, the control signals generated by controllers 50, 52 are configured to cause delivery of a relatively low fluid pressure to the wheel brakes 34 on trailer 14 because one or more of the conditions evaluated above are indicative of a lack of stability for trailer 14. As discussed above, the threshold speed used in the comparison in step 116 may vary and may be established by controllers 50, 52 in step 104. In particular, controllers 50, 52 may vary the predetermined speed based on one or more indicators of the level of friction between the wheels 20 of tractor-trailer 10 and the road surface. When those indicators indicate a relatively high level of friction (and therefore stability), controllers 50, 52 establish a relatively high predetermined speed such that step 118 may proceed even at relatively high speeds. Conversely, when those indicators indicate a relatively low level of friction (and therefore stability), controllers 50, 52 establish a relatively low predetermined speed such that the process will proceed to step 120 unless tractor-trailer 10 is moving at a relatively low speed.

Figure 4:
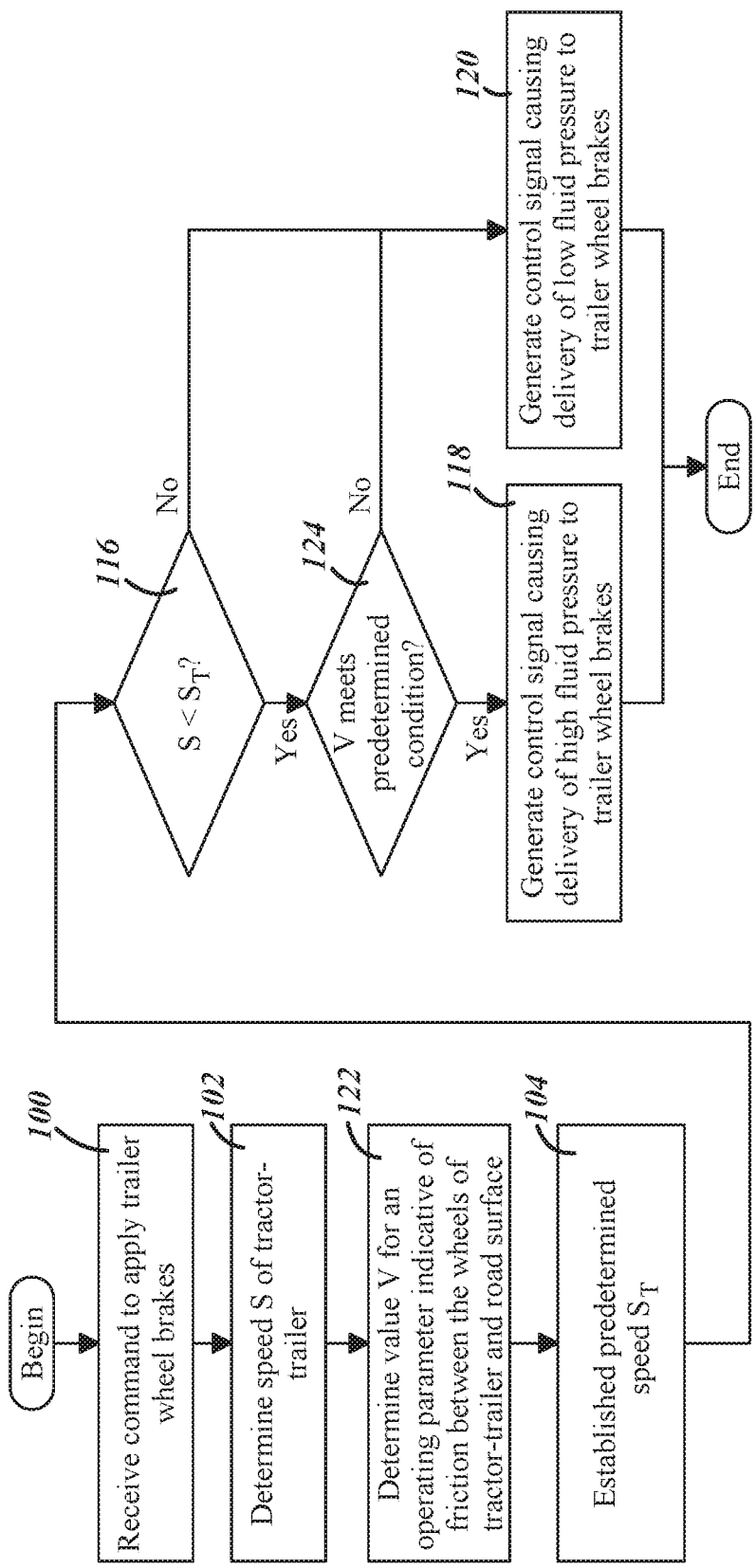
FIG. 4 is flow chart diagram illustrating several steps in a method for controlling wheel brakes on the trailer of a tractor-trailer in accordance with another embodiment of the present teachings.

Referring now to FIG. 4, another embodiment of a method for controlling the wheel brakes 34 on trailer 14 is illustrated. Several of the steps in the embodiment illustrated in FIG. 4 are the same or substantially the same as similarly numbered steps in the embodiment illustrated in FIG. 3 and a description of these steps may be found above. The embodiment in FIG. 4 differs from the embodiment in FIG. 3 in that controllers 50, 52 are configured to obtain values for one or more operating parameters of tractor-trailer 10 that are indicative of friction between the wheels 20 and road surface, determine whether those parameters meet predetermined conditions, and generate control signals for the trailer wheel brakes 34 responsive to both this determination and a determination of whether the vehicle speed meets a predetermined condition relative to a threshold speed. Ultimately, the embodiment in FIG. 4 may consider one or more of the same factors used to establish the threshold speed in step 104 of FIG. 3 independently of that step in determining what type of control signal to generated for the trailer wheel brakes 34.

The method embodiment illustrated in FIG. 4 may again begin with the step 100, 102 of receiving a command to apply a wheel brake 34 for one of the wheels 20 on trailer 14 and determining the speed of tractor-trailer 10. Upon receipt of the command to apply the wheel brakes 34 on trailer 14, controllers 50, 52 also determine, in step 122, a value for one or more operating parameters of tractor-trailer 10 indicative of a level of friction between tractor-trailer 10 and a road surface on which the tractor-trailer is travelling. As the level of friction between the wheels 20 on tractor-trailer 10 and the road surface decreases, the stability of tractor-trailer 10 decreases (assuming again, that the other variables such as vehicle speed remain constant). Therefore, the level of friction between wheels 20 and the road surface is indicative of the stability of trailer 14. As discussed above, a variety of operating parameters associated with tractor-trailer 10 may be indicative of the level of friction between wheels 20 and the road surface. In one embodiment, the operating parameter may comprise a brake pressure being applied to one or more of the wheel brakes 34 on tractor 12. Brake pressure in the wheel brakes on tractor 12 is indicative of road surface conditions. In particular, a relatively high fluid pressure applied to wheel brakes 34 on tractor 12 is indicative of the ability to rapidly decelerate and a high level of friction between the wheels 20 and the road surface. A relatively low fluid pressure applied to wheel brakes 34 on tractor 12 is indicative of a low level of friction between the wheels 20 and road surface. Controllers 50, 52 may determine the pressure at one or more of the wheel brakes on tractor 12 responsive to signals generated by pressure sensors 38. In another embodiment, the operating parameter may comprise whether anti-lock braking has been activated for a wheel brake 34 on tractor 12. The activation of anti-lock braking is indicative of wheel slip and, therefore, a relatively low level of friction between the wheels 20 on tractor 12 and the road surface. Because tractor 12 is generally forward of trailer 14 in the direction of travel of tractor-trailer 10, it can be assumed that the wheels 20 of trailer 14 will pass over the same road surface as the wheels 20 of tractor 12. Therefore, the activation of anti-lock braking in tractor 12 will also indicate a decrease in stability of trailer 14. Because controller 50 implements anti-lock braking when required through control signals issued to relay valves 72, 74 and modular valves 78, 80, 82, 84, 86, controller 50 can readily determine whether anti-lock braking has been activated in one of the brakes 34 on tractor 12. This information can be passed to controller 52 over connector 98. In yet another embodiment, the operating parameter may comprise a load applied to a trailer axle 22 of trailer 14. Greater loads will increase the level of friction between the wheels 20 on trailer 14 and the road surface and therefore increase the stability of trailer 14. Controller 52 may determine the load on one or more trailer axles 22 responsive to signals generated by a load sensor 48 and this information may be provided to controller 50 over connector 98. Although FIG. 4 illustrates steps 102, 122 occurring in a particular sequence, it should be understood that steps 102, 122, may be performed in any order or simultaneously.

After determining the speed of tractor-trailer 10 and values for one or more operating parameters associated with tractor-trailer 10 that are indicative of the level of friction between the wheels 20 of tractor-trailer 10 and the road surface, controllers 50, 52 may compare the determined speed and parameter value to a threshold speed (determined in step 104) and predetermined parameter value to see whether the determined speed and parameter value meet predetermined conditions and then generate a control signal to control delivery of fluid pressure to the wheel brakes 34 on trailer 14 in response. In general, where the determined speed and parameter value indicate a relatively high degree of stability for trailer 14, controllers 50, 52 will generate control signals that cause delivery of a relatively high fluid pressure to the wheels brakes 34 on trailer 14 to reduce the stopping distance of tractor-trailer 10 as discussed below. Where one or more of the determined speed and parameter value indicate a relatively low degree of stability for trailer 14, controllers 50, 52 will generate control signals that cause delivery of a relatively low fluid pressure to the wheel brakes 34 on trailer 14 as also discussed below.

In step 116, controllers 50, 52 compare the speed of tractor-trailer 10 determined in step 102 to the threshold speed established in step 104. If the speed meets a predetermined condition relative to the threshold speed (e.g., is less than the predetermined speed), controllers 50, 52 proceed to step 124. In step 124, controllers 50, 52 determine whether the value for the operating parameter determined in step 122 meets a predetermined condition. The nature of the predetermined condition will depend on the nature of the operating parameter. In the case where the operating parameter comprises the brake pressure of one or more of the wheel brakes 34 on the wheels 20 of tractor 12, the predetermined condition may be that the pressure is greater than a predetermined pressure. In the case where the operating parameter is whether anti-lock braking has been activated for one or more wheel brakes 34 of tractor 12, the predetermined condition may be that anti-lock braking has not been activated. In the case where the operating parameter is the load on a trailer axle 22, the predetermined condition may be whether the load is greater than a predetermined load. Controllers 50, 52 may make these determinations using information stored in memories forming part of controllers 50, 52 or drawn from other memories and systems on tractor-trailer 10.

Depending on the determinations made in steps 116, 124, the method continues with one of steps 118, 120. In steps 118, 120, controllers 50, 52 generate one or more control signals configured to control delivery of fluid pressure to the wheel brakes 34 on trailer 14. The signals may be directed to relay valve 76. If the speed determined in step 102 meets the predetermined condition relative to the threshold speed established in step 104 and if the value of the operating parameter determined in step 122 also meets the corresponding predetermined condition, the method proceeds with step 118. In step 118, the control signals generated by controllers 50, 52 are configured to cause delivery of a relatively high fluid pressure to the wheel brakes 34 on trailer 14 because the various conditions evaluated above are indicative of a relatively high degree of stability for trailer 14. If the speed determined in step 102 does not meet the predetermined condition relative to the threshold speed established in step 104 or if the value of the operating parameter determined in step 122 does not meet the corresponding predetermined condition, the method proceeds with step 120. In step 120, the control signals generated by controllers 50, 52 are configured to cause delivery of a relatively low fluid pressure to the wheel brakes 34 on trailer 14 because one or more of the conditions evaluated above are indicative of a lack of stability for trailer 14. As discussed above, the predetermined speed used in the comparison in step 116 may vary and may be established by controllers 50, 52 in step 104. In particular, controllers 50, 52 may vary the predetermined speed based on one or more indicators of the level of friction between the wheels 20 of tractor-trailer 10 and the road surface. When those indicators indicate a relatively high level of friction (and therefore stability), controllers 50, 52 establish a relatively high predetermined speed such that step 118 may proceed even at relatively high speeds. Conversely, when those indicators indicate a relatively low level of friction (and therefore stability), controllers 50, 52 establish a relatively low predetermined speed such that the process will proceed to step 120 unless tractor-trailer 10 is moving at a relatively low speed.

A system and method for controlling wheel brakes 34 on a trailer 14 in a tractor-trailer 10 in accordance the present teachings represent an improvement as compared to conventional systems and methods. In particular, the system and method disclosed herein identify certain conditions that are indicative of trailer stability. During such conditions, increased braking forces can be applied to the trailer wheel brakes 34 when needed for emergency braking even when the AEB system 24 on the tractor 12 lacks knowledge regarding whether one or more trailers 14 has an anti-lock braking system or other automated system that would help maintain the stability of the trailer 14. In this manner, the stopping distance of the tractor-trailer 10 can be reduced during emergency braking events.

While the invention has been shown and described with reference to one or more particular embodiments thereof, it will be understood by those of skill in the art that various changes and modifications can be made without departing from the spirit and scope of the invention.

What is claimed is:

1. A system for controlling wheel brakes on a trailer in a tractor-trailer, comprising:
   a vehicle speed sensor configured to generate a speed signal indicative of a speed of the tractor-trailer; and,
   a controller configured to
      receive a command to apply a trailer wheel brake of a trailer of the tractor-trailer;
      determine, in response to the command, the speed of the tractor-trailer responsive to the speed signal;
      establish a threshold speed responsive to a level of friction between the tractor-trailer and a road surface on which the tractor-trailer is travelling; and,
      generate a control signal to control delivery of fluid pressure to the trailer wheel brake wherein the control signal is configured to cause delivery of a first fluid pressure to the trailer wheel brake when the speed meets a first predetermined condition relative to the threshold speed and a second fluid pressure, less than the first fluid pressure, when the speed does not meet the first predetermined condition relative to the threshold speed
   wherein the controller is further configured, in establishing the threshold speed, to
      determine a torque on a wheel of the tractor-trailer;
      determine a coefficient of friction between the wheel and the road surface responsive to the torque;

estimate a lateral force acting on the wheel responsive to a signal indicative of movement of a tractor of the tractor-trailer and not indicative of movement of the trailer;
adjust the coefficient of friction responsive to the lateral force to obtain an adjusted coefficient of friction between the wheel and the road surface; and,
determine the threshold speed responsive to the adjusted coefficient of friction.

2. The system of claim 1 wherein the first predetermined condition is that the speed is less than the threshold speed.

3. The system of claim 1, further comprising a yaw rate sensor configured to generate a yaw rate signal indicative of a speed of rotation of the tractor about a vertical axis and wherein the controller is configured to estimate the lateral force acting on the wheel responsive to the yaw rate signal.

4. The system of claim 1, further comprising a steer angle sensor configured to generate a steering signal indicative of an angle of rotation of a steering wheel of the tractor-trailer and wherein the controller is configured to estimate the lateral force acting on the wheel responsive to the steering signal.

5. The system of claim 1, further comprising a pressure sensor configured to generate a pressure signal indicative of a brake pressure applied to a wheel brake associated with the wheel of the tractor-trailer and wherein the controller determines the torque on the wheel responsive to the pressure signal.

6. The system of claim 1, further comprising a load sensor configured to generate a load signal indicative of load on an axle of the tractor-trailer and wherein the controller determines the coefficient of friction responsive to the torque and the load signal.

7. The system of claim 1 wherein the controller adjusts the coefficient of friction responsive to the lateral force and at least one of an ABS flag indicative of whether an anti-locking braking system of the tractor-trailer has been activated and an ATC flag indicative of whether an automatic traction control system of the tractor-trailer has been activated.

8. A system for controlling wheel brakes on a trailer in a tractor-trailer, comprising:
a vehicle speed sensor configured to generate a speed signal indicative of a speed of the tractor-trailer; and,
a controller configured to
receive a command to apply a trailer wheel brake of a trailer of the tractor-trailer;
determine, in response to the command, the speed of the tractor-trailer responsive to the speed signal; and
establish a threshold speed responsive to a level of friction between the tractor-trailer and a road surface on which the tractor-trailer is travelling;
determine, in response to the command, a value for an operating parameter of the tractor-trailer indicative of the level of friction between the tractor-trailer and the road surface on which the tractor-trailer is travelling; and,
generate a control signal to control delivery of fluid pressure to the trailer wheel brake wherein the control signal is configured to cause delivery of a first fluid pressure to the trailer wheel brake when the speed meets a first predetermined condition relative to the threshold speed and the value of the operating parameter meets a second predetermined condition and the control signal is configured to cause delivery of a second fluid pressure, less than the first fluid pressure, when the speed does not meet the first predetermined condition relative to the threshold speed or the value of the operating parameter does not meet the second predetermined condition;
wherein the controller is further configured, in establishing the threshold speed, to
determine a torque on a wheel of the tractor-trailer,
determine a coefficient of friction between the wheel and the road surface responsive to the torque,
estimate a lateral force acting on the wheel responsive to a signal indicative of movement of a tractor of the tractor-trailer and not indicative of movement of the trailer,
adjust the coefficient of friction responsive to the lateral force to obtain an adjusted coefficient of friction between the wheel and the road surface, and,
determine the threshold speed responsive to the adjusted coefficient of friction.

9. The system of claim 8 wherein the operating parameter comprises a brake pressure applied to a tractor wheel brake of a tractor of the tractor-trailer and the second predetermined condition is that the brake pressure is greater than a predetermined pressure.

10. The system of claim 8 wherein the operating parameter comprises whether anti-lock braking has been activated for a tractor wheel brake of a tractor of the tractor-trailer and the second predetermined condition is that anti-lock braking has not been activated for the tractor wheel brake.

11. The system of claim 8 wherein the operating parameter comprises a load applied to a trailer axle of the trailer and the second predetermined condition is that the load is greater than a predetermined load.

12. The system of claim 8 wherein the controller is further configured to establish the threshold speed responsive to a direction of travel of the tractor-trailer.

13. An article of manufacture, comprising:
a non-transitory computer storage medium having a computer program encoded thereon that when executed by a controller controls a trailer wheel brake on a trailer in a tractor-trailer, the computer program including code for:
determining, in response to a command to apply a trailer wheel brake of a trailer of the tractor-trailer, a speed of the tractor-trailer responsive to a speed signal generated by a vehicle speed sensor and indicative of the speed of the tractor-trailer;
establishing a threshold speed responsive to a level of friction between the tractor-trailer and a road surface on which the tractor-trailer is travelling; and,
generating a control signal to control delivery of fluid pressure to the trailer wheel brake wherein the control signal is configured to cause delivery of a first fluid pressure to the trailer wheel brake when the speed meets a first predetermined condition relative to the threshold speed and a second fluid pressure, less than the first fluid pressure, when the speed does not meet the first predetermined condition relative to the threshold speed
wherein the code for establishing the threshold speed includes code for:
determining a torque on a wheel of the tractor-trailer;
determining a coefficient of friction between the wheel and the road surface responsive to the torque;
estimating a lateral force acting on the wheel responsive to a signal indicative of movement of a tractor of the tractor-trailer and not indicative of movement of the trailer;

adjusting the coefficient of friction responsive to the lateral force to obtain an adjusted coefficient of friction between the wheel and the road surface; and, determining the threshold speed responsive to the adjusted coefficient of friction.

14. The article of manufacture of claim 13 wherein the first predetermined condition is that the speed is less than the threshold speed.

15. The article of manufacture of claim 13 wherein the code for estimating a lateral force on the wheel includes code for establishing the lateral force on the wheel responsive to a yaw rate signal generated by a yaw rate sensor and indicative of a speed of rotation of the tractor about a vertical axis.

16. The article of manufacture of claim 13 wherein the code for estimating a lateral force on the wheel includes code for establishing the lateral force on the wheel responsive to a steering signal generated by a steer angle sensor and indicative of an angle of rotation of a steering wheel of the tractor-trailer.

17. The article of manufacture of claim 13 wherein the code for determining the torque on the wheel of the tractor-trailer includes code for determining the torque responsive to a pressure signal generated by a pressure sensor and indicative of a brake pressure applied to a wheel brake associated with the wheel of the tractor-trailer.

18. The article of manufacture of claim 13 wherein the code for determining the coefficient of friction between the wheel and the road surface includes code for determining the coefficient of friction responsive to a load signal generated by a load sensor and indicative of load on an axle of the tractor-trailer.

19. The article of manufacture of claim 13 wherein the code for adjusting the coefficient of friction includes code for adjusting the coefficient of friction responsive to the lateral force and at least one of an ABS flag indicative of whether an anti-locking braking system of the tractor-trailer has been activated and an ATC flag indicative of whether an automatic traction control system of the tractor-trailer has been activated.

20. A method for controlling wheel brakes on a trailer in a tractor-trailer, comprising the steps of:
receiving a command to apply a trailer wheel brake of a trailer of the tractor-trailer;
determining, in response to the command, a speed of the tractor-trailer responsive to a speed signal generated by a vehicle speed sensor and indicative of the speed of the tractor-trailer
establishing a threshold speed responsive to a level of friction between the tractor-trailer and a road surface on which the tractor-trailer is travelling; and,
generating a control signal to control delivery of fluid pressure to the trailer wheel brake wherein the control signal is configured to cause delivery of a first fluid pressure to the trailer wheel brake when the speed meets a first predetermined condition relative to the threshold speed and a second fluid pressure, less than the first fluid pressure, when the speed does not meet the first predetermined condition relative to the threshold speed
wherein the establishing step includes the substeps of
determining a torque on a wheel of the tractor-trailer;
determining a coefficient of friction between the wheel and the road surface responsive to the torque;
estimating a lateral force acting on the wheel responsive to a signal indicative of movement of a tractor of the tractor-trailer and not indicative of movement of the trailer;
adjusting the coefficient of friction responsive to the lateral force to obtain an adjusted coefficient of friction between the wheel and the road surface; and,
determining the threshold speed responsive to the adjusted coefficient of friction.

21. The method of claim 20 wherein the first predetermined condition is that the speed is less than the threshold speed.

22. The method of claim 20 wherein the estimating substep includes estimating the lateral force acting on the wheel responsive to a yaw rate signal generated by a yaw rate sensor and indicative of a speed of rotation of the tractor about a vertical axis.

23. The method of claim 20 wherein the estimating substep includes estimating the lateral force acting on the wheel responsive to a steering signal generated by a steer angle sensor and indicative of an angle of rotation of a steering wheel of the tractor-trailer.

24. The method of claim 20 wherein the sub step of determining a torque on a wheel of the tractor-trailer includes determining the torque responsive to a pressure signal generated by a pressure sensor and indicative of a brake pressure applied to a wheel brake associated with the wheel of the tractor-trailer.

25. The method of claim 20 wherein the sub step of determining the coefficient of friction includes determining the coefficient responsive to a load signal generated by a load sensor and indicative of load on an axle of the tractor-trailer.

26. The method of claim 20 wherein the sub step of adjusting the coefficient of friction includes adjusting the coefficient of friction responsive to the lateral force and at least one of an ABS flag indicative of whether an anti-locking braking system of the tractor-trailer has been activated and an ATC flag indicative of whether an automatic traction control system of the tractor-trailer has been activated.

* * * * *